A. D. ANTOINE AND C. C. TRAVIS.

CHECK DETECTOR FOR CHECK ACTUATED MACHINES.

APPLICATION FILED SEPT. 20, 1916.

Reissued July 6, 1920. 14,905.

2 SHEETS—SHEET 1.

Inventors:

Alfred D. Antoine

Clarence C. Travis.

By J. F. Jochum Jr. Atty

A. D. ANTOINE AND C. C. TRAVIS.

CHECK DETECTOR FOR CHECK ACTUATED MACHINES.

APPLICATION FILED SEPT. 20, 1916.

Reissued July 6, 1920.

14,905.

2 SHEETS—SHEET 2.

Inventors:
Alfred D. Antoine.
Clarence C. Travis.
By. [signature] Atty.

UNITED STATES PATENT OFFICE.

ALFRED D. ANTOINE, OF CHICAGO, AND CLARENCE C. TRAVIS, OF EVANSTON, ILLINOIS, ASSIGNORS TO ADVANCE MACHINE CO., OF CHICAGO, ILLINOIS, A CORPORATION OF ILLINOIS.

CHECK-DETECTOR FOR CHECK-ACTUATED MACHINES.

14,905. Specification of Reissued Letters Patent. Reissued July 6, 1920.

Original No. 1,193,967, dated August 8, 1916, Serial No. 804,339, filed December 3, 1913. Application for reissue filed September 20, 1916. Serial No. 121,300.

*To all whom it may concern:*

Be it known that we, ALFRED D. ANTOINE and CLARENCE C. TRAVIS, citizens of the United States, residing, respectively, at Chicago and Evanston, in the county of Cook and State of Illinois, have invented certain new and useful Improvements in Check-Detectors for Check-Actuated Machines, of which the following is a specification.

This invention relates to improvements in check detectors for use with check control mechanisms, automatic vending machines, or similar devices, which require the deposit of a check to render the same operative, and one of the objects of the present invention is to provide an improved device of this character having means whereby the same may be operated when the proper check, or a check of predetermined character is deposited therein, but which will remain inoperative, when an improper check or other device is deposited therein and will operate to arrest such improper check or device.

A further object is to provide an improved device of this character having means for shifting or unseating the check when it has been moved to a predetermined position to prevent it from being returned to the operator.

Other and further objects will appear from the following specification and claims, in connection with the accompanying drawings, in which:

Figure 1:
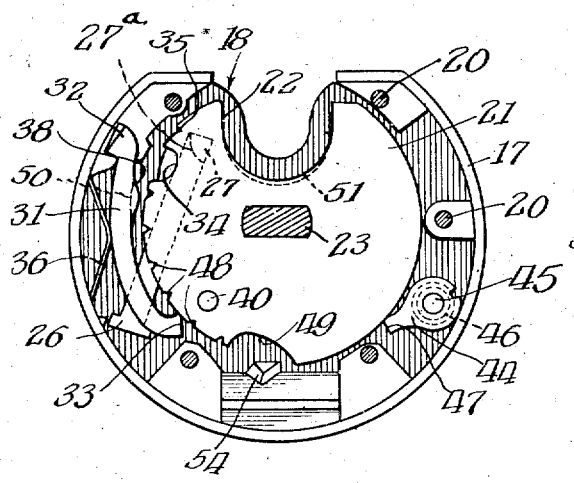
Figure 1 is a rear elevation of an improved device of this character, constructed in accordance with the principles of this invention, with the rear wall of the casing removed and with the operating handle in section, showing the disk and coöperating parts in normal position.

Referring more particularly to the drawings, and in the present exemplification of this invention, the casing within which the mechanism is housed consists primarily of a front plate 15 and a rear plate 16, the front plate 15 being preferably of a size slightly larger than the rear plate and being preferably provided with a circumferential flange within which the rear plate is arranged, and the two plates when assembled constitute the housing, having a check entrance opening 18 and a discharge opening 19, and the parts of the casing are secured together in any suitable manner such as by means of the fastening devices 20.

Rotatably mounted within the casing thus formed is a disk 21, and by the use of the term disk to be hereinafter employed in the specification and claims, is to be understood to mean any suitable check carrying element.

Figure 5:
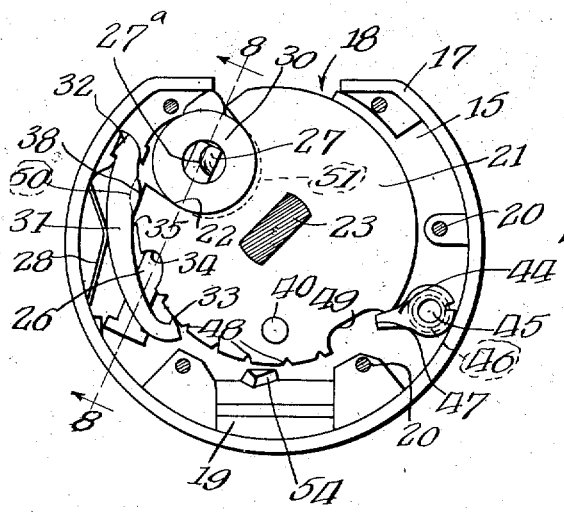
Fig. 5 is a view similar to Fig. 1 showing the positions the parts will assume when a washer or apertured slug is deposited in the check seat and the disk advanced.
Figure 8:
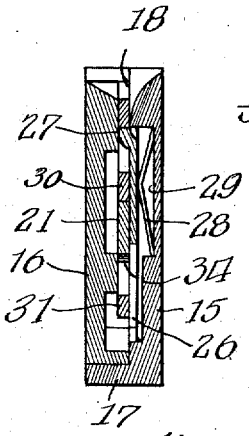
Fig. 8 is a sectional view taken on line 8, Fig. 5.

This disk is provided with a check seat 22 opening through its periphery, and is adapted to be rotated by means of a suitable handle 23 projecting beyond the face of the casing. The handle 23 preferably projects through the rear wall 16 of the casing, and connected thereto in any suitable manner is an elastic element 24, which is anchored by its free end to a fixed support, and tends normally to move the disk in one direction, so as to cause the check seat 22 to register with the check entrance opening 18. Mounted within the recess 25, preferably in the front wall of the casing, and on one side of the disk 21 (see particularly Fig. 8) is a catch or member 26 which is provided with a deflected portion or head 27, that is adapted to be projected into the opening of the check seat 22 of the disk 21, and an elastic member 28, preferably in the form of a leaf spring is provided, and seated within another recess 29, beneath the catch or member 26, and is so arranged that it tends normally to move the head 27, in a direction to enter the check seat, so that when a washer 30 is placed within the check seat and the disk rotated, the projection or head 27 will enter the aperture or opening in the washer (see Fig. 5) and thereby positively arrest the washer and the movement of the disk 21. The coin carrier is however, free to be rotated in the reverse direction to carry the washer back to a position in which it may be removed, the beveled surface 27[a] of the head of the member 26 permitting such removal.

Figure 4:
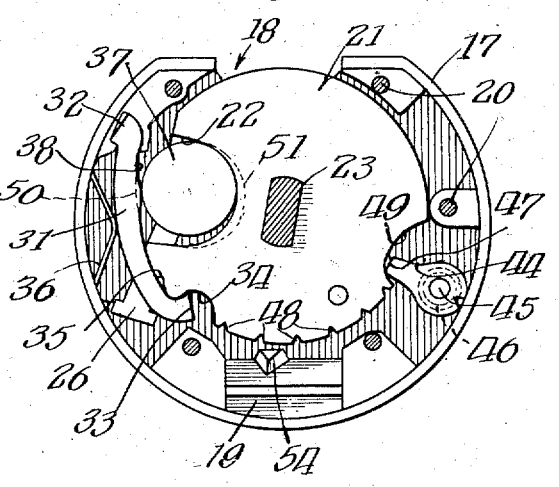
Fig. 4 is a view similar to Fig. 1, showing the positions the parts will assume when an improper check is deposited in the check seat and the disk advanced.

Arranged adjacent the periphery of the disk is another catch 31 which is mounted for pivotal movement by its extremity 32 and is provided with a hooked extremity 33 adapted to enter the recess 34 in the periphery of the disk 21. The disk is also provided with a notch 35 adjacent the recess 34 and into which notch the extremity 33 of the catch 31 is also adapted to project, and an elastic member 36, preferably in the form of a leaf spring is provided, which tends normally to move the extremity 33 of the notch 35 toward the periphery of the disk. This catch 31 is provided as additional means for arresting the movement of the disk so that when a check of an improper size such as check 37 in Fig. 4 is placed within the check seat and the disk 21 is rotated, the extremity 33 of the catch 31 will be moved by the elastic member 36, into the recess 34 of the disk when the recess is adjacent the extremity of the catch and thereby lock the disk against rotation to arrest the advancement of the check. Should however, a check other than a proper check, be deposited in the check seat, and which check is of a size to engage the face 38 of the catch 31, sufficiently to move the extremity 33 of the catch so that it will not enter the recess 34, the catch will, just as soon as the check passes out of engagement with the face 38, move under the influence of the elastic member 36 to cause the extremity 33 of the catch to engage the notch 35 in the disk and thus lock the disk against further advancement.

Figure 2:
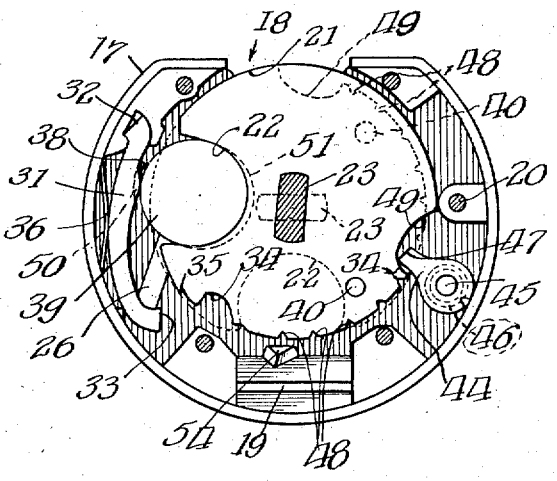
Fig. 2 is a view similar to Fig. 1, showing in full lines the position the parts will assume when a check of the proper denomination or character is placed in the check seat and the disk revolved, and also showing the parts in dotted lines in the positions they will assume when the disk is moved sufficiently to discharge the check.

When a check of a proper size, such as check 39 in Fig. 2, is deposited in the check seat, the disk 21 may be rotated and during the advancing movement the check will depress the catch 26 by engaging the projection 27 and the periphery of the check will engage the face 38 of the catch 31, to move the latter into the position shown in full lines in Fig. 2 or into the position that the disk may be rotated sufficiently to permit the check 39 to be discharged from the check seat and out of the outlet or discharge opening 19 in the casing. During this rotation of the disk, a stress has been exerted upon the elastic member 24, so that when the handle 23 is released after the check has been discharged, the stress of the elastic member 24 will rotate the disk in the opposite direction.

The stop 40 may be provided to extend from the face of the disk 21 to travel in a groove or way 41, in the plate 16 and this stop is adapted to coöperate with the shoulders 42, 43 of the groove or way, to limit the extent of movement of the disk in one direction or the other.

In order to lock the disk 21 against retrograde movement, from each direction of movement of the disk, there is provided in the present form of this invention, a reversible pawl 44, pivotally mounted as at 45 and controlled by an elastic member 46. This pawl is arranged so that its extremity 47 will be adjacent the periphery of the disk, and the disk is provided with a series of peripheral notches 48 into which the pawl projects, and there is also provided a recess 49 in the periphery of the disk which is preferably spaced from the recess 34, and between which recesses 34, 49 the notches 48 are preferably arranged.

In normal position, the pawl 44 assumes the position shown in Fig. 1.

Figure 3:
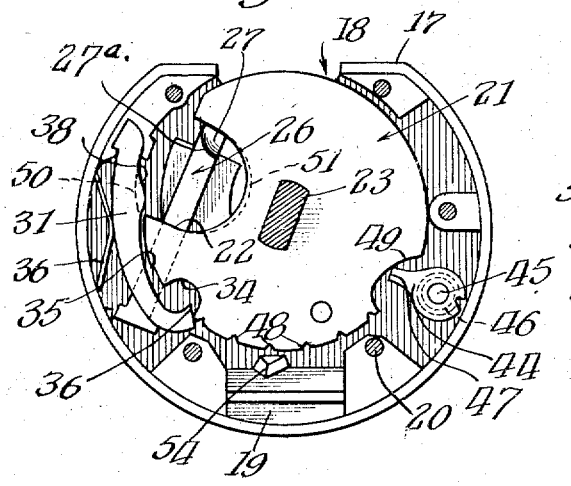
Fig. 3 is a view similar to Fig. 1, showing the positions the parts will assume when the check disk is rotated without depositing a check in the seat.

Assuming now that a check of proper denomination is placed in the check seat, and the disk 21 is rotated in the manner already described, the pawl 44 will remain in the position shown in Fig. 1 until the recess 49 is in a position to receive the extremity of the pawl, at which time the elastic member 46, will cause the pawl to assume the position shown in Figs. 3 and 4. In this position of the pawl, and when the disk 21 is moved still farther in the same direction the advancing shoulder formed by the recess 49 will engage the pawl, and a still further movement of the disk in the same direction will cause the pawl to assume a position to point upwardly, or in a direction opposite to the direction to which it points in Figs. 1 and 5. This will cause the extremity to enter notches 48 and thereby lock the disk against retrograde movement. The pawl will remain in this position with respect to the disk until the recess 34 is moved into the position to receive the end of the pawl 44, which it will do when the proper check is carried by the disk, and at the time that the check seat 22 assumes a position or registers with the outlet opening 18, the elastic member 46 will cause the pawl to then move into the recess 34, and by then reversing the direction of the movement of the disk, the pawl will be reversed into the position shown in Figs. 1 and 5, when the pawl will again coöperate with the notches 48 to lock the disk against another and different retrograde movement.

In order to prevent the operation of the device by the insertion of a thin check, the catch 31 is provided in the face of the portion 38 adjacent the periphery of the disk, with a recess 50, preferably arranged to one side of the medial line of such face, so that the edges of the thin check will pass into this recess to prevent the catch 31 from being moved into a position that the extremity 33 thereof would not engage the shoulder formed by the wall of the recess 34.

Figure 9:
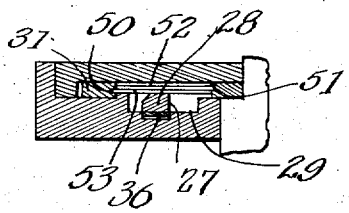
Fig. 9 is a transverse sectional view showing two thin checks in the disk and the positions they will assume with relation to the catch and to each other.
Figure 11:
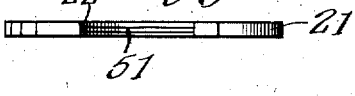
Fig. 11 is a top plan view of the check seat showing the recess in the wall thereof.
Figure 10:
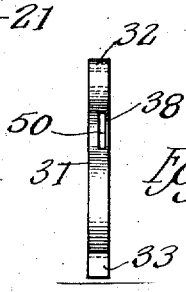
Fig. 10 is an elevation of a portion of one of the catches, showing the recess therein.

A similar recess 51 may be provided in the bottom of the check seat 22 and the recesses 50, 51 are preferably off-set laterally with respect to each other, so that in the event of two thin checks 52, 53 being placed simultaneously in the check seat (see Fig. 9), the checks will be off-set with respect to each other, a portion of one check entering the recess 51 in the check seat, and a portion of the other check will enter the recess 50 in the catch 30 so that the latter will not be tripped thereby.

Figure 6:
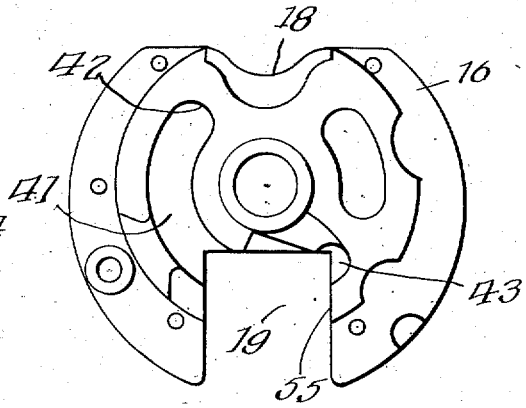
Fig. 6 is a front elevation of the rear plate of the casing.
Figure 7:
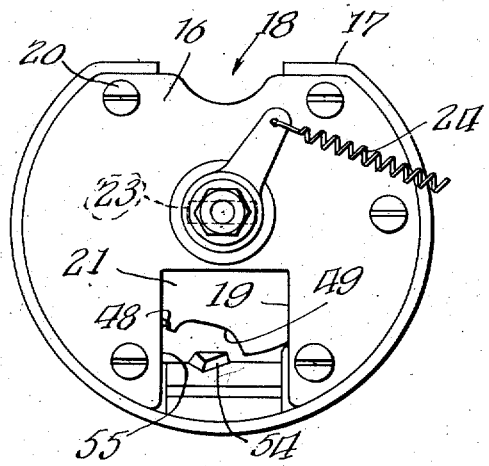
Fig. 7 is a rear elevation of an improved device of this class constructed in accordance with the principles of this invention.

To prevent the check from being returned to the operator, by a reverse movement of the disk 21, after the check has been moved by the disk to a position that it has performed its proper function, a shoulder or projection 54 is provided. This shoulder or projection is arranged within the path of movement of the check within the check seat so that when the check engages the shoulder, the latter will unseat or dislocate the check with respect to the check seat, so that upon a reverse movement of the disk, the edge of the check will engage a shoulder 55 (see Fig. 6) and will thereby lock the check against return movement. This shoulder or projection 54 also serves as a means for ejecting the check from the seat when it has been moved to a position adjacent the check discharging opening.

While in the present exemplification of this invention, the preferred forms and constructions have been herein shown and described, it will be understood that various changes may be made therein without departing from the spirit of this invention.

What is claimed as new is:

1. A device of the character described, embodying a casing having a check entrance and a check discharge opening, a rotatable check carrier provided with a check receiving orifice, a normally inactive catch, said catch having a shoulder, means operating to move the catch to cause the said shoulder to enter the check receiving orifice when the latter is positioned adjacent the shoulder and in the absence of a check in the orifice, an additional catch disposed between the casing and the periphery of the check carrier, and being also disposed entirely within the plane formed by the side faces of the check carrier, and a shoulder on the periphery of the check carrier and with which shoulder the second recited catch coöperates when the first said catch is inactive, a portion of the second recited catch projecting into the path of movement of the edge of the check in the receiving orifice.

2. A device of the character described, embodying a casing having a check entrance and a check discharge opening, a rotatable check carrier provided with a check receiving orifice, a normally inactive catch, said catch having a shoulder, means operating to move the catch to cause the said shoulder to enter the check receiving orifice when the latter is positioned adjacent the shoulder and in the absence of a check in the orifice, an additional catch disposed between the periphery of the check carrier and the casing and being also disposed entirely within the plane formed by the side faces of the check carrier, a shoulder on the periphery of the check carrier and with which shoulder the second recited catch coöperates when the first said catch is inactive, a portion of the second recited catch projecting into the path of movement of the edge of the check in the receiving orifice, means tending normally to move the check carrier in one direction and means for moving the carrier in the opposite direction and against the stress of the first said means.

3. A device of the character described, embodying a casing having a check entrance and a check discharge opening, a rotatable carrier provided with a check receiving orifice, a normally inactive catch, said catch having a shoulder, means operating to move the catch to cause the said shoulder to enter the check receiving orifice when the latter is positioned adjacent the shoulder and in the absence of a check in the orifice, an additional catch disposed between the periphery of the check carrier and casing and being also disposed entirely within the plane formed by the side faces of the check carrier, a shoulder on the periphery of the check carrier and with which shoulder the second recited catch coöperates when the first said catch is inactive, a portion of the second recited catch projecting into the path of the movement of the edge of the check in the receiving orifice, means for rotating the carrier, and a stop device for limiting the degree of rotation of the carrier.

4. A device of the character described, embodying a casing, having a check entrance and a check discharge opening, a rotatable check carrier provided with a check receiving orifice, a normally inactive catch, said catch having a shoulder, means operating to move the catch to cause the said shoulder to enter the check receiving orifice when the latter is positioned adjacent the shoulder and in the absence of a check in the orifice, an additional catch disposed between the periphery of the check carrier and the casing and being also disposed entirely within the plane formed by the side faces of the check carrier, a shoulder on the periphery of the check carrier and with which shoulder the second recited catch coöperates, when the first recited catch is inactive, a portion of the second recited catch projecting into the path of movement of the edge of the check in the receiving orifice, and interengaging means between the carrier and casing for limiting the extent of rotation of the carrier.

5. A device of the character described, embodying a casing having a check entrance and a check discharge opening, a rotatable check carrier provided with a check receiving orifice, a normally inactive catch, said catch having a shoulder, means operating to move the catch to cause the said shoulder to enter the check receiving orifice when the latter is positioned adjacent the shoulder and in the absence of a check in the orifice, an additional catch disposed between the periphery of the catch and the casing and being also disposed entirely within the plane formed by the side faces of the check carrier, a shoulder on the periphery of the check carrier and with which shoulder the second recited catch coöperates when the first said catch is inactive, a portion of the second recited catch projecting into the path of movement of the edge of the check in the receiving orifice, and an additional shoulder on the carrier and with which the second recited catch coöperates under predetermined conditions.

6. A device of the character described, embodying a casing having a check entrance and a check discharge opening, a rotatable check carrier provided with a check receiving orifice, a normally inactive catch, said catch having a shoulder, means operating to move the catch to cause the said shoulder to enter the check receiving orifice when the latter is positioned adjacent the shoulder and in the absence of a check in the orifice, an additional catch disposed between the periphery of the check carrier and the casing, a shoulder on the periphery of the check carrier and with which shoulder the second recited catch coöperates when the first said catch is inactive, a portion of the second recited catch projecting into the path of movement of the edge of the check in the receiving orifice, said catches operating transversely with respect to each other, and an ejector operating to dislodge the check with respect to the receiving orifice.

7. A device of the character described, embodying a casing having a check entrance and a check discharge opening, a rotatable check carrier provided with a check receiving orifice, a normally inactive catch, said catch having a shoulder, means operating to move the catch to cause the said shoulder to enter the check receiving orifice when the latter is positioned adjacent the shoulder and in the absence of a check in the orifice, an additional catch disposed between the periphery of the check carrier and the casing, a shoulder on the periphery of the check carrier and with which shoulder the second recited catch coöperates when the first said catch is inactive, a portion of the second recited catch projecting into the path of movement of the edge of the check in the receiving orifice, to be engaged and moved by the check, and provisions whereby an improper check will pass said portion without moving the last said catch.

8. A device of the character described, embodying a casing having a check entrance and a check discharge opening, a rotatable check carrier provided with a check receiving orifice, a normally inactive catch, said catch having a shoulder, means operating to move the catch to cause the said shoulder to enter the check receiving orifice when the latter is positioned adjacent the shoulder and in the absence of a check in the orifice, an additional catch disposed between the periphery of the check carrier and the casing, a shoulder on the periphery of the check carrier and with which shoulder the second recited catch coöperates when the first said catch is inactive, a portion of the second recited catch projecting into the path of movement of the edge of the check in the receiving orifice to be engaged by the check, said catches operating transversely with respect to each other, and one of the catches projecting over the other, and provisions whereby an improper check will pass said portion without moving the catch, the said provisions embodying a recess in one of the coöperating parts into which a thinner check will project.

9. A device of the character described, embodying a casing having a check entrance, and a check discharging opening, a disk rotatable in the casing and having a check seat, a plurality of yielding catches controlled by the check, said catches crossing each other and operating transversely with respect to each other, one of the catches having a portion projecting into the path of the seat, the other catch having a portion adjacent the path of movement of the edge of the check in the seat, and being provided with a recess in its adjacent face and into which recess checks of a size less than a predetermined thickness will project.

10. A device of the character described, embodying a casing having a check entrance, and a check discharging opening, a disk rotatable in the casing and having a check seat, a plurality of yielding catches controlled by the check, said catches operating transversely with respect to each other, one of the catches having a portion adapted to project into the seat, the other catch having a portion adjacent the path of movement of the edge of the check in the seat, and being provided with a recess in its adjacent face to one side of a medial line of such face and into which recess checks of a size less than a predetermined thickness will project.

11. A device of the character described, embodying a casing, having a check receiving and a check discharging opening, a disk rotatable therein and having a check seat, and a plurality of yielding catches controlled by the check, operating transversely with respect to each other and one of which catches has a portion adjacent the path of movement of the edge of the check in the seat, the wall of the check seat being provided with an open recess and into which recess a check of a size less than a predetermined thickness will project.

12. A device of the character described, embodying a casing having a check entrance, and a check discharging opening, a disk rotatable in the casing and having a check seat, and a yielding catch having a portion of its surface adjacent the path of movement of a check in the seat, the said surface and the wall of the check seat being provided with opposed recesses of a width less than the width of the said surface and the wall of the check seat.

13. A device of the character described, embodying a casing having a check entrance, and a check discharging opening, a disk rotatable in the casing and having a check seat, and a yielding catch having a portion of its surface adjacent the path of movement of the check in the seat, the said surface and the wall of the check seat being provided with opposed recesses, said recesses being off-set laterally with respect to each other.

14. In a coin controlled machine, a casing having a coin slot or passage, a rotatable coin carrier, a yieldable member supported at one end and provided at its other or free end with a head projecting normally into said coin slot or passage, whereby said head is adapted to enter the opening of a washer on said coin carrier, said head having a beveled surface and an abrupt surface so arranged that said abrupt surface unyieldingly engages the inner edge of the washer and thereby positively locks said washer and coin carrier against forward movement, said beveled surface permitting removal of the inserted washer through said coin slot.

15. In a coin controlled machine, a casing having a coin slot or passage, a rotatable coin carrier, an upwardly extending yieldable member supported at its lower end and provided at its upper or free end with a head projecting normally into said coin slot or passage, whereby said head is adapted to enter the opening of a washer on said coin carrier, said head having a beveled surface and an abrupt surface so arranged that said abrupt surface unyieldingly engages the inner edge of the washer and thereby positively locks said washer and coin carrier against forward movement, said beveled surface permitting removal of the inserted washer through said coin slot.

16. In a coin controlled machine, a casing having a coin slot or passage, a coin carrier normally free to rotate in a direction to carry the deposited coin into operative position within the machine, a yieldable member supported at one end and provided at its other or free end with a head projecting normally into said coin slot or passage, whereby said head is adapted to enter the opening of a washer on said coin carrier, said head having a beveled surface and an abrupt surface so arranged that said abrupt surface unyieldingly engages the inner edge of the washer and thereby positively locks said washer and coin carrier against forward movement, said beveled surface permitting reverse rotation of the coin carrier for the removal of the inserted washer through said coin slot, and a hand-operable member mounted on the front wall of said casing for operating said coin carrier.

17. In a coin controlled machine, a casing having a coin slot or passage, a coin carrier normally free to rotate in a direction to carry the deposited coin into operative position within the machine, an upwardly extending yieldable member supported at its lower end and provided at its upper or free end with a head projecting normally into said coin slot or passage, whereby said head is adapted to enter the opening of a washer on said coin carrier, said head having a beveled surface and an abrupt surface so arranged that said abrupt surface unyieldingly engages the inner edge of the washer and thereby positively locks said washer and coin carrier against further movement, said beveled surface permitting reverse rotation of the coin carrier for removal of the inserted washer through said coin slot, and a hand-operable member on the front wall of said casing for operating said coin carrier.

ALFRED D. ANTOINE.
CLARENCE C. TRAVIS.